Nov. 22, 1932.　　　J. W. BISHOP　　　1,888,652
PHONOGRAPH
Filed Sept. 4, 1930　　　7 Sheets-Sheet 1

Inventor
Joseph W. Bishop

Nov. 22, 1932.　　　J. W. BISHOP　　　1,888,652
PHONOGRAPH
Filed Sept. 4, 1930　　7 Sheets-Sheet 2
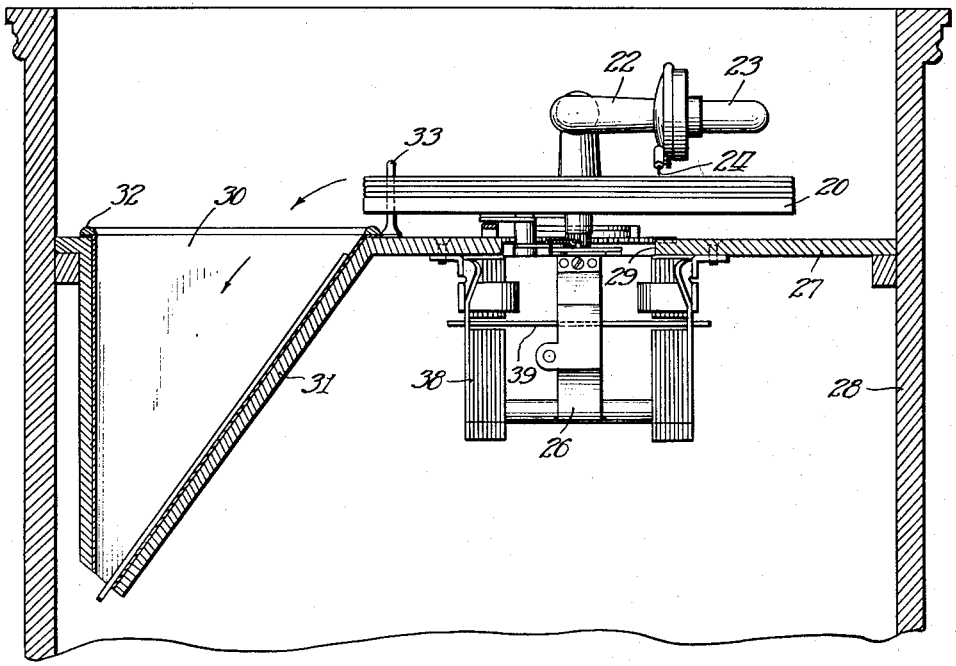
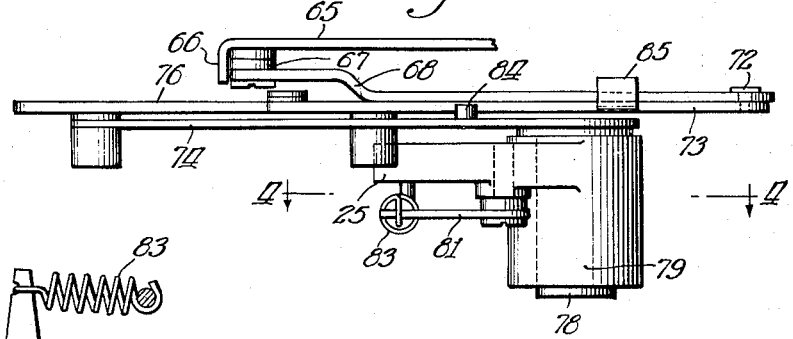
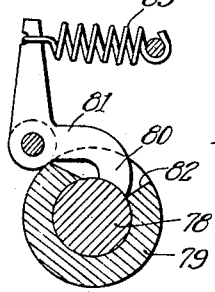
Inventor
Joseph W. Bishop Nov. 22, 1932. J. W. BISHOP 1,888,652
PHONOGRAPH
Filed Sept. 4, 1930 7 Sheets-Sheet 3

Inventor
Joseph W. Bishop
By Chindahl Parker & Carlson
Attys.

Nov. 22, 1932.  J. W. BISHOP  1,888,652
PHONOGRAPH
Filed Sept. 4, 1930  7 Sheets-Sheet 4
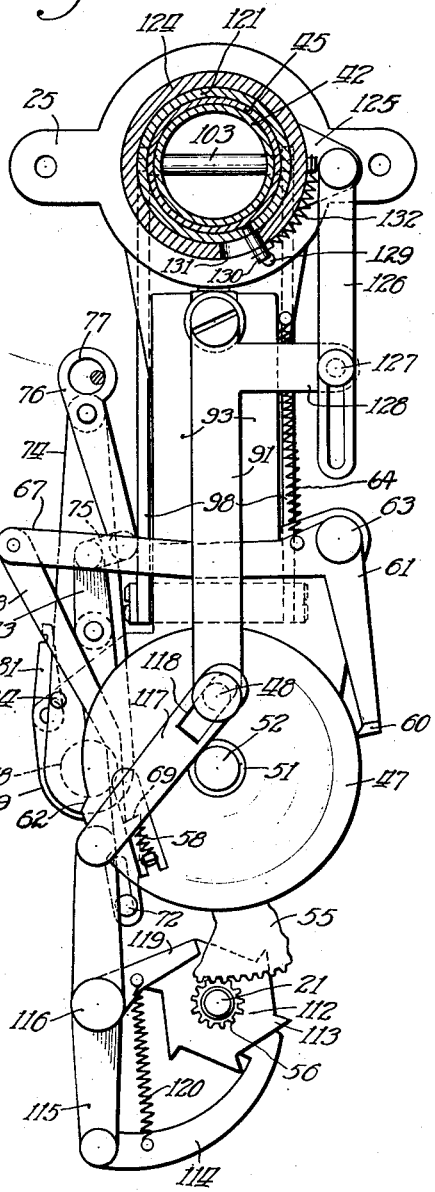
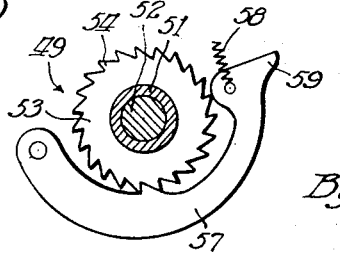
Inventor
Joseph W. Bishop Nov. 22, 1932.  J. W. BISHOP  1,888,652
PHONOGRAPH
Filed Sept. 4, 1930    7 Sheets-Sheet 5

Inventor
Joseph W. Bishop
By Crindall Parker Carlson
Attys.

Nov. 22, 1932.  J. W. BISHOP  1,888,652
PHONOGRAPH
Filed Sept. 4, 1930   7 Sheets-Sheet 6

Inventor
Joseph W. Bishop
By Chindall Parke & Carlson
Attys.

Nov. 22, 1932. J. W. BISHOP 1,888,652
PHONOGRAPH
Filed Sept. 4, 1930 7 Sheets-Sheet 7
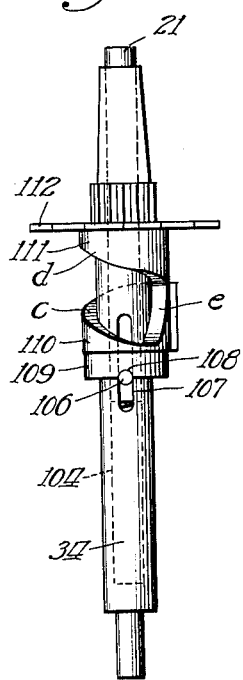
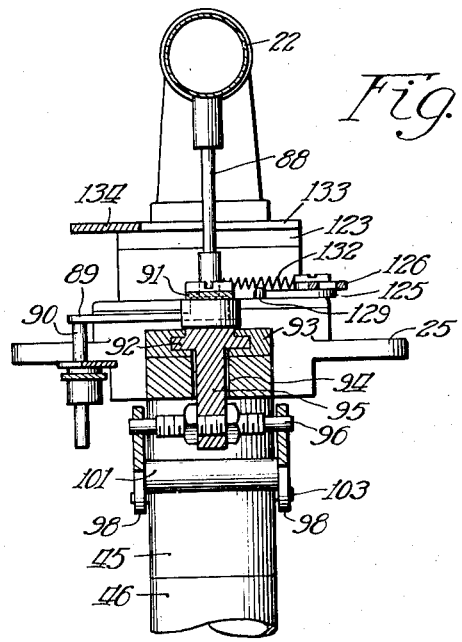
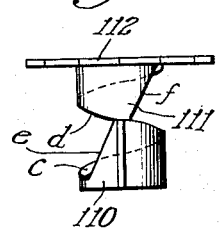
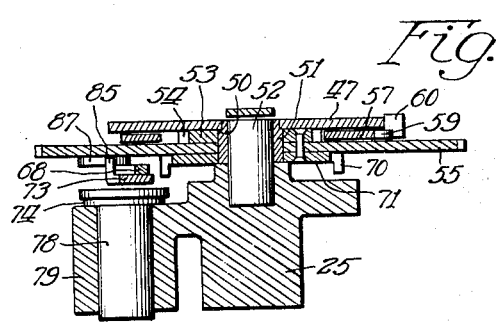
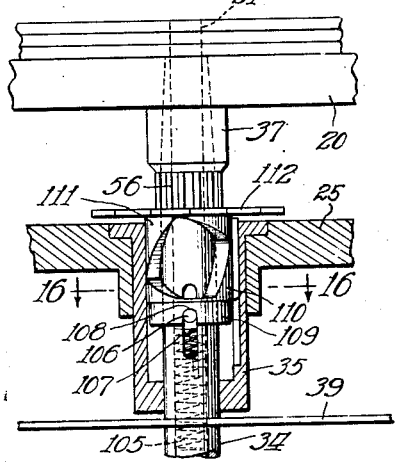
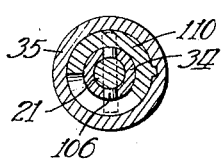
Inventor
Joseph W. Bishop Patented Nov. 22, 1932

1,888,652

UNITED STATES PATENT OFFICE

JOSEPH W. BISHOP, OF MUSKEGON HEIGHTS, MICHIGAN, ASSIGNOR TO UNITED RESEARCH CORPORATION, A CORPORATION OF DELAWARE

PHONOGRAPH

Application filed September 4, 1930. Serial No. 479,616.

The present invention relates generally to improvements in phonographs, and more particularly to phonographs capable of automatically playing a plurality of disk records in succession.

The invention is embodied in a phonograph having a turntable on which a plurality of records are adapted to be stacked. A tone arm is movable over the turntable, and carries a sound box with a stylus adapted to be brought into and out of engagement with the uppermost record. Various mechanisms operable in timed relation and adapted to be actuated by a unitary drive means are provided for raising and lowering the sound box, retracing the centering pin to release the uppermost record, discharging the record, and swinging the tone arm outwardly into position over the starting point of the record groove.

One of the objects of the present invention resides in the provision of a novel clutch for connecting the drive means to a source of power, and more particularly new and improved mechanical means operable either automatically upon cessation of movement of the tone arm upon completing the playing of the uppermost record, or manually at will, for closing and opening the clutch.

Another object is to provide novel means for raising the tone arm to elevate the sound box from the uppermost record, maintaining the tone arm in elevated position for a predetermined period, and then lowering the tone arm to bring the stylus into engagement with the next record.

A further object resides in the provision of novel means for automatically retracting the centering pin in a step-by-step movement, one step for each record, and returning the centering pin to its uppermost position after playing of the last record.

Another object resides in the provision of new and improved means for discharging the uppermost record when the centering pin has been retracted to release the record.

A further object is to provide novel means for swinging the tone arm while the latter is in elevated position.

A general object is to provide a novel phonograph which is simple, compact and inexpensive in construction, and which is efficient and reliable in operation.

Further objects and advantages will become apparent as the description proceeds.

In the accompanying drawings, Figure 1 is a plan view of a phonograph embodying the features of my invention.

Fig. 2 is a vertical sectional view taken substantially along line 2—2 of Fig. 1.

Fig. 3 is a fragmentary elevational view of the clutch operating mechanism.

Fig. 4 is a horizontal sectional view taken along line 4—4 of Fig. 3.

Fig. 6 is a fragmentary plan view of the record changing mechanism in operation.

Fig. 7 is a fragmentary plan view of the clutch operating mechanism shown in Fig. 3.

Fig. 8 is a fragmentary plan view of the clutch.

Fig. 11 is a vertical sectional view taken along line 11—11 of Fig. 9.

Fig. 12 is a vertical sectional view taken along line 12—12 of Fig. 9.

Fig. 13 is a side elevational view of the indexing means for centering pin, the pin being shown in its lowermost position.

Fig. 14 is a fragmentary side view of the construction shown in Fig. 13.

Fig. 15 is a view generally similar to Fig. 13 but showing the centering pin in an intermediate position.

Fig. 16 is a horizontal sectional view taken substantially along line 16—16 of Fig. 15.

Figure 1:
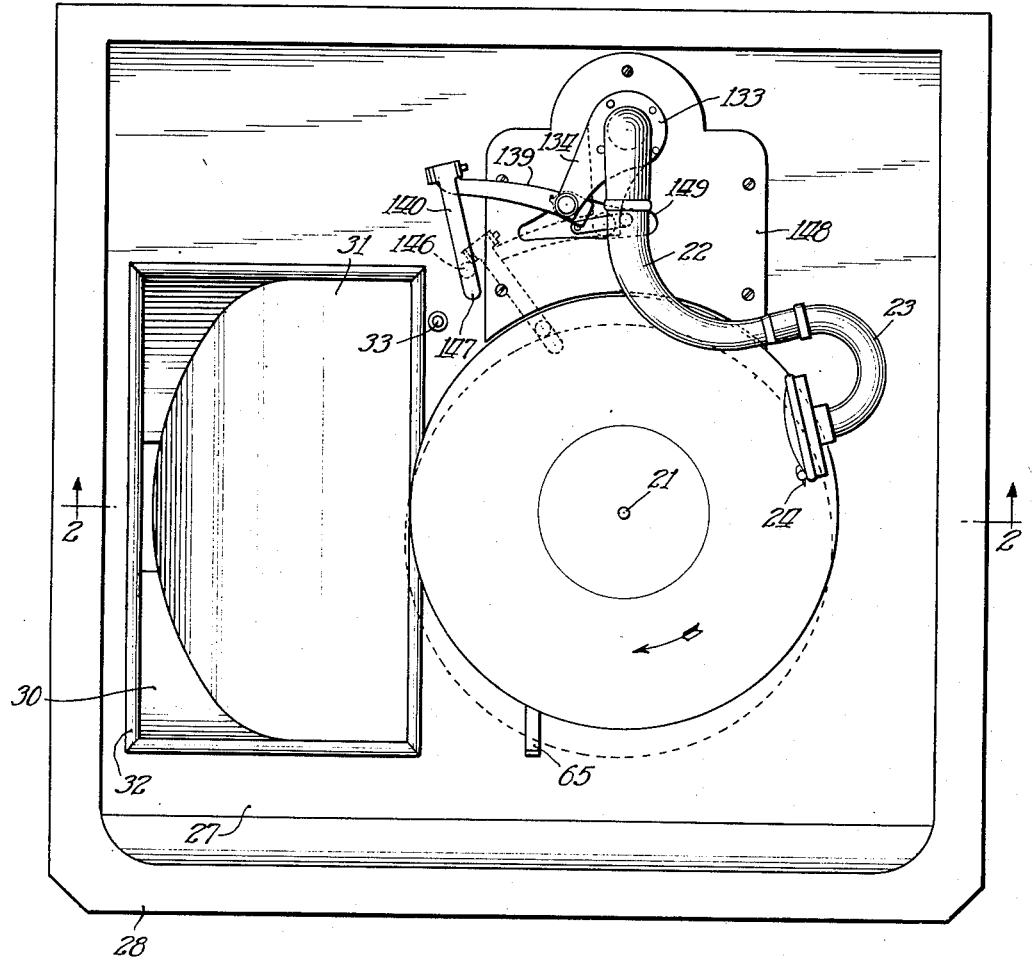

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the drawings, the phonograph constituting the exemplary embodiment of the invention is of the type in which a plurality of records are played automatically in sequence. The phonograph in general comprises a suitable horizontal rotatable support or turntable 20 with a vertically adjustable, upstanding axial centering pin 21, a horizontally swinging arm 22 designated for convenience as a tone arm, and a sound box 23 pivotally mounted on the free end of the tone arm 22. A suitable stylus 24 is removably inserted in the sound box 23.

The records to be played are stacked on the turntable 20 to the height of the centering pin 21 with the latter in its uppermost position of adjustment. To play the uppermost record, the stylus 24 is brought into engagement with the record groove at the starting point adjacent the outer periphery. The tone arm 22 permits the stylus 24 to travel the course of the record groove to play the record, and then into an inner groove located at a predetermined distance from the center.

Movement of the tone arm 22 under the influence of the stylus 24 into its innermost position institutes the operation through one cycle of a driving member for actuating various mechanisms respectively effective to elevate the stylus 24 out of engagement with the played record, to retract the centering pin 21 through the depth of one record, to eject the played record and to swing the tone arm 22 outwardly into position over the initial starting point. Thereupon, the stylus 24 is lowered into engagement with the next record, and the foregoing operation is repeated.

The operating mechanism of the phonograph comprises a suitable elongated base plate 25 and a frame structure 26 (see Fig. 9) mounted on the underside of the forward end of the plate, and is adapted to be mounted in any suitable enclosure. In the present instance, the base plate 25 and the frame structure 26 are mounted on the underside of a horizontal shelf 27 in a cabinet 28, a suitable opening 29 being formed in the shelf to accommodate the operating mechanism. A discharge receptacle 30 (see Figs. 1 and 2) is built in one side of the cabinet 28, and is provided with an inclined shelf 31 extending downwardly from one side of the turntable 20 to receive the records as the latter are ejected one by one. A suitable yieldable lining 32 is provided for the receptacle 30. An upstanding guide pin 33 is mounted on the shelf 27 at the edge of the receptacle 30 and to the rear of the turntable 20 for directing the records into the receptacle.

The turntable 20 is suitably mounted on the upper end of a vertical drive spindle 34 (see Figs. 9 and 10) which extends through and is journaled in the lower end wall of a flanged sleeve 35 seated in the base plate 25, and the lower end of which seats on and is journaled in a bearing 36 in the bottom of the frame structure 26. Preferably, the turntable 20 is formed axially with a depending tapered socket 37 having a driving fit with the tapered upper end of the spindle 34.

Any suitable means may be provided for driving the spindle 34, and in the present instance this means comprises an induction motor 38 with a disk rotor 39. The motor coils are mounted in the frame structure 26, and the rotor 39 is adjustably secured to the spindle 34. A suitable speed governor (not shown) is connected to the spindle 34 through a spiral gear 40.

The tone arm 22 may be of any suitable form, and preferably is curved through an arc of 90° in a horizontal plane. The base end of the tone arm 22 is struck down at right angles to define a tubular pivot sleeve 41. The sleeve 41 (see Figs. 6 and 10) telescopes with a sliding fit into the upper end of a vertical sleeve 42, and bears at its lower end against a collar 43 secured in the latter. A suitable pin and slot connection 44 is provided between the sleeves 41 and 42 permitting a limited independent rotation of the sleeve 41 incidental in the swinging movement of the tone arm 22. The sleeve 42 is vertically reciprocable in a bearing sleeve 45 rigidly secured in the rear end of the base plate 25. A conduit 46 connected to the lower end of the bearing sleeve 45 leads to the horn (not shown). While I have shown a tone arm 22 and a sound box 23, it is to be understood that an electrical pickup mounted on a swinging arm and adapted to be connected to a loud speaker may be substituted.

Figure 9:
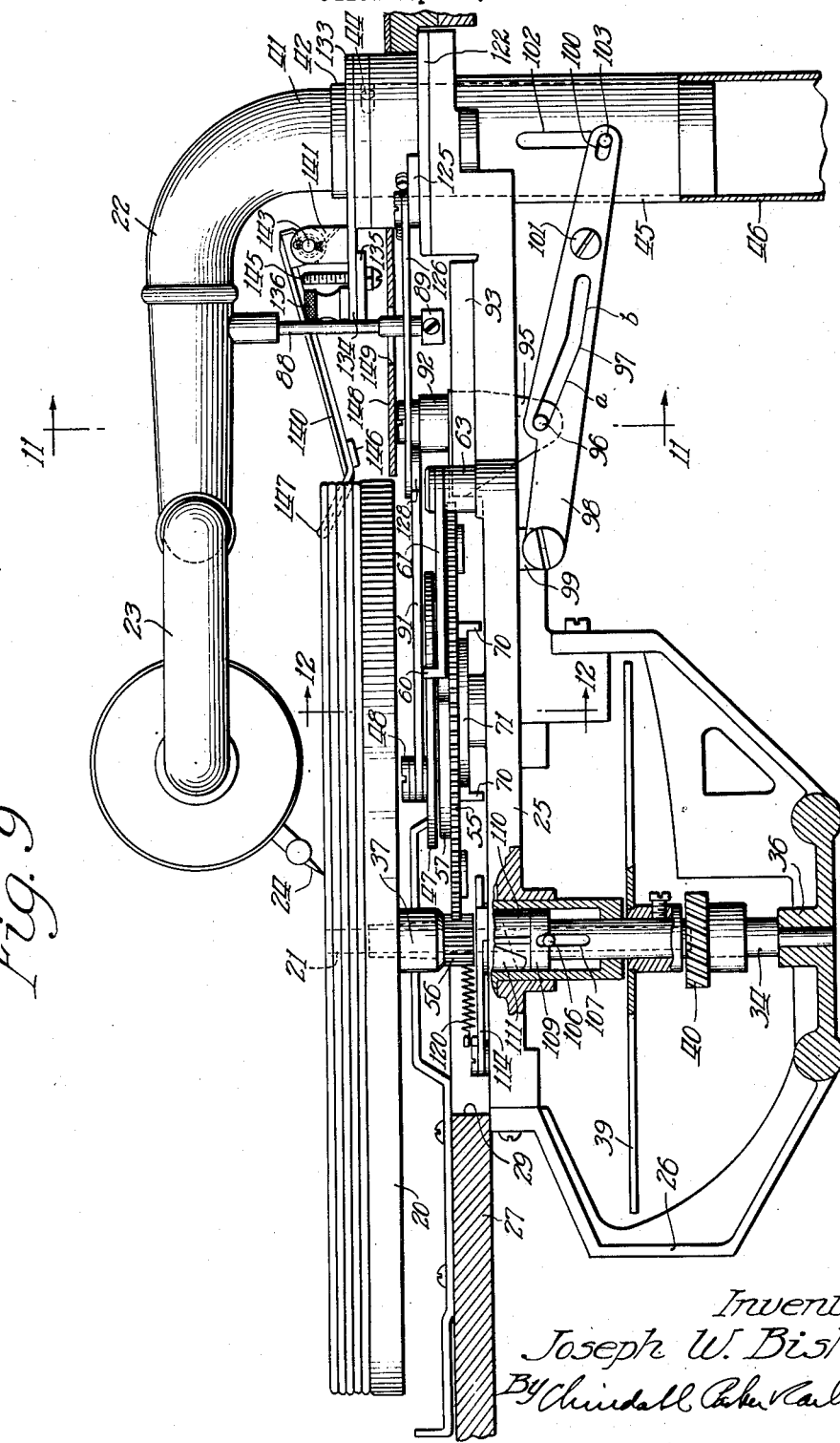
Fig. 9 is a side view, partially in section, of the record changing mechanism shown in Fig. 5.
Figure 10:
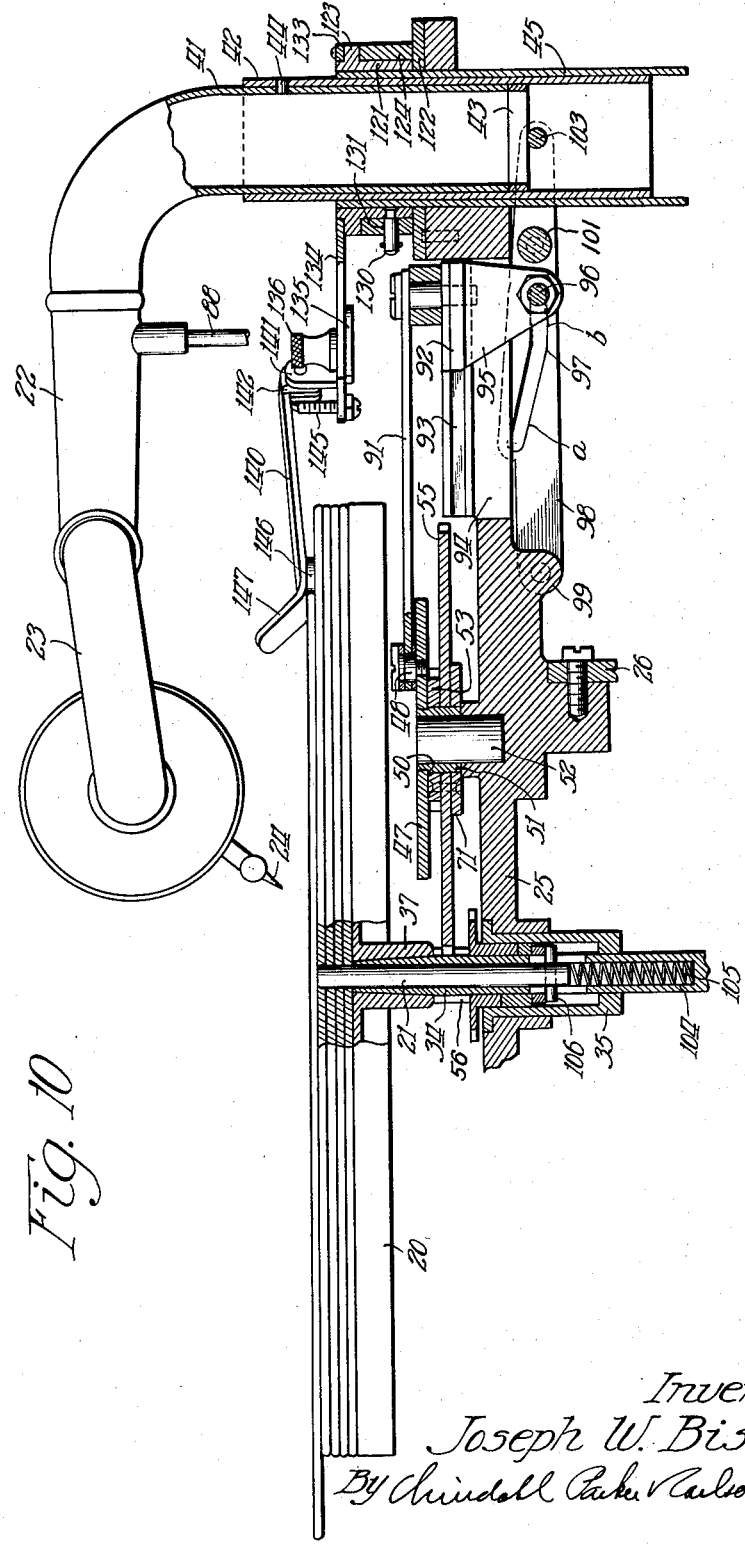
Fig. 10 is vertical sectional view taken along line 10—10 of Fig. 5.

The sound box 23 is pivotally mounted on the free end of the tone arm 22, and is manually adjustable through approximately 180° either into operative position as shown in Figs. 9 and 10, or into inoperative position to facilitate changing of the stylus 24. The connection with the tone arm 22 serves to support the sound box 23 in either extreme position, and permits independent vertical movement of the sound box when the stylus 24 is following the course of the record groove.

Operatively mounted on the base plate 25 is a drive member, preferably in the form of a disk 47 with a crank pin 48 (see Figs. 5, 9 and 12), which is adapted to be driven periodically to actuate the various mechanisms for elevating and lowering the stylus 24, retracting the centering pin 21 one step for each record, ejecting the played record, and swinging the tone arm 22 outwardly into position over the initial point.

The drive disk 47 may be connected to any suitable source of power, and preferably is adapted to be connected through a suitable clutch 49 to the drive spindle 34 for the turntable 20. To this end, the drive disk 47 is rotatably mounted against a shoulder 50 on a bushing 51 fixed on a stud 52 on the base plate 25. A clutch element 53 having a plurality of peripherally spaced ratchet teeth 54 is rotatably mounted on the bushing 51 below the disk 47, and is rigid with a concentric gear 55 connected through a pinion 56 to the spindle 34. Pivotally mounted at one end on the underside of the disk 47 for movement therewith is an arcuate clutch pawl 57 (see Fig. 8) having a tooth movable into and out of engagement with one of the teeth 54 to complete the drive to the disk. A coiled tension spring 58 connected to the disk 47 and the free end of the pawl 57 tends to swing the latter inwardly to establish this connection.

The free end of the pawl 57 is formed with a heel 59 which extends slightly beyond the periphery of the disk 47. A throw-out abutment or finger 60 on the end of one arm of a bell-crank lever 61 rides against the periphery of the disk 47, and is adapted to engage the heel 59 to open the clutch 49 upon movement of the disk into its idle inoperative position (see Fig. 5). An inclined offset 62 is formed in the periphery of the disk 47 slightly back of the heel 59 when the clutch 49 is closed, which permits the abutment 60 to move inwardly as the disk comes to rest. The lever 61 is pivotally mounted on a post 63 on the base plate 25. A coiled tension spring 64 anchored at its ends to the base plate 25 and the lever 61 tends to urge the abutment 60 yieldingly against the disk 47.

Means operable manually at will or automatically upon movement of the tone arm 22 into its innermost position at the conclusion of playing a record is provided for moving the abutment 60 out of the path of the heel 59 to release the pawl 57 into engagement with the clutch element 53, and thereby to institute operation of the disk 47.

The manual release (see Figs. 3, 5 and 9) comprises a bar 65 slidably confined to the top of the shelf 27, and extending forwardly for actuation from the front of the machine. The rear end of the bar 65 is struck down to form a lug 66 which hooks over the free end of the arm 67 of the bell-crank lever 61.

The automatic release (see Figs. 3, 5, 6, 7 and 12) preferably is a non-set mechanism, and comprises a lever 68 which is pivotally connected at one end to the arm 67, and which is formed on its other end with a hook 69 adapted to be moved into position for engagement by either of two depending diametrically opposed lugs 70. The lugs 70 are formed on the periphery of a disk 71 rigidly secured to the underside of the gear 55 for rotation therewith.

A suitable compound leverage is provided for moving the hook 69 into and out of position to release the pawl 57. In the present instance, the hook end of the lever 68 has a pin and slot connection 72 with one end of a lever 73 pivotally mounted intermediate its ends on an intermediate portion of a supporting arm or plate 74. The other end of the lever 73 is flexibly connected by a short link 75 to one end of a floating lever 76 pivotally mounted intermediate its ends on the free end of the base arm 74, and the other end of the lever 76 is formed with an opening 77. The base arm 74 is provided with a pivot stud 78 which is rotatably mounted in a depending tubular bearing 79 formed on the base plate 25 adjacent the hook 69.

A suitable brake shoe 80 (see Fig. 4) formed on one arm of a bell-crank lever 81 pivotally mounted on the underside of the base plate 25 projects through an opening 82 in the side of the bearing 79 into frictional bearing engagement with the stud 78. A coiled tension spring 83 anchored at its ends to the base plate 25 and the free arm of the lever 81 tends to urge the shoe 80 yieldingly against the stud 78.

A pair of spaced upstanding pins 84 are provided on the arm 74 respectively at opposite sides of the lever 73 to limit the degree of oscillatory movement of the latter. Also formed on the outer edge of the lever 73 is an upstanding lug 85 with a curved cam surface 86 on its outer face adapted through successive engagement by a plurality of peripherally spaced circular disks or abutments 87 on the underside of the gear 55 for moving the hook 69 into the path of the lugs 70.

The tone arm 22 is provided with a depending pin 88. A lateral arm 89 is rotatably secured at one end to the lower end of the pin 88, and is provided on its free end with a depending pin 90 extending loosely through the opening 77 in the lever 76 so as to transmit the swinging movements of the tone arm 22 to the latter. The dimensions of the opening 77 are such as to prevent slight back and forward movement of the tone arm in the playing of a record from actuating the operating mechanism.

When a record is being played, the gear 55 is constantly rotating and each abutment 87 cams the hooked lever 68 forwardly into a position where the hook 69 would, if allowed to remain in that position, engage the next lug 70 and throw in the clutch. The continued inward movement of the tone arm 22, however, acting through the floating lever 76 restores the hooked lever to a rearward and inoperative position before the next lug 70 engages it; and this action and counter-action continues until the record has been completely played and the stylus, following the final circular groove of the record, no longer causes the tone arm to advance; thereupon the lever 68 is permitted to remain when next advanced by an abutment 87 and its hook 69 engages the next lug 70 and throws in the clutch. During the rotation of the disk 47, it serves to hold the hook 69 in inoperative position.

The drive disk 47 upon rotation immediately actuates the mechanism for elevating the stylus 24 out of engagement with the record. This mechanism may be of any suitable type, and preferably acts to raise the tone arm 22. In the present instance, it comprises a crank arm 91 which is pivotally connected at its ends respectively to the crank pin 48 and a slide 92 (see Figs. 10 and 11) and which extends across dead center when the disk 47 is in its inoperative position. The slide 92 is reciprocable along suitable parallel guides 93 on the base plate 25 between the gear 55 and the support for the tone arm 22 and extending diametrically of the gear 55. A longitudinal slot 94 is formed in the base plate 25 parallel to and between the guides 93, and a depending lug 95 on the slide 92 extends through the slot to the underside of the base plate 25.

Adjustably threaded through the lower end of the lug 95 is a transverse guide pin 96. The opposite ends of the pin 96 extend slidably into two opposite registering cam slots 97 which are formed respectively in two parallel side arms 98 constituting a lever. The side arms 98 are pivotally connected at one end to a lug 99 formed on the underside of the base plate 25, and at the other end are formed respectively with longitudinal slots 100, and are connected adjacent said slots by a spacer 101. Extending through the reciprocatory sleeve 42 supporting the tone arm 22 and through two vertical diametrically opposed slots 102 in the bearing sleeve 45 is a connecting pin 103 the opposite ends of which extend through the slots 100 in the arms 98.

Preferably, the cam slots 97 are each formed with an inclined section $a$ effective through coaction with the pin 96 to adjust the tone arm 22 vertically, and a longitudinal section $b$ movable into a horizontal position upon elevating the tone arm 22 to provide a dwell for the tone arm when in its elevated position.

It will be evident that in the first half of the rotation of the disk 47, the slide 92 will be moved away from the gear 55, thus causing the pin 96 to travel first along the sections $a$ of the cam slots 97 to raise the tone arm 22, and then along the sections $b$ to maintain the tone arm in elevated position, and that in the last half of the rotation, the movements will be reversed, the tone arm finally being lowered into playing position.

Suitable means is provided for retracting the centering pin 21 in a step-by-step movement in the playing of a series of records, one step for each record, and returning the centering pin to its uppermost position when all of the records have been handled. Any desired number of steps may be provided depending on the number of records that may be stacked on the turntable 20 at one time. In the present instance, five down steps and one return step are provided, thus adapting the turntable for a stack of six records. The last record of the stack need not be ejected automatically, and hence the centering pin 21 need not be retracted below this record but can be returned to its uppermost position in the sixth step.

Referring particularly to Figs. 10 and 13 to 16, the centering pin 21 is virtually reciprocable in an axial bore 104 formed in the upper end of the drive spindle 34, and extends therefrom to above the turntable 20. A coiled compression spring 105 disposed in the lower end of the bore 104 tends to urge the pin 21 upwardly. Extending diametrically through the centering pin 21 is a pin 106. The opposite ends of the pin 106 extend out of the bore 104 through two diametrically opposed longitudinal slots 107 formed in the spindle 34, and engage in two notches 108 formed in the lower end of a ring 109 slidable on the spindle. A circular lower cam member 110 is mounted on the spindle 34 in end bearing engagement with the ring 109, and is slidably keyed for axial movement to the sleeve 35.

A circular upper cam member 111 in coacting engagement with the cam member 110 is freely rotatable in the sleeve 35 about the spindle 34, and is formed on its upper end with a ratchet wheel 112 overlying the base plate 25. The pinion 56 on the spindle 34 serves to hold the ratchet wheel 112 in axial position. The coacting ends of the cam members 110 and 111 are formed respectively through approximately five-sixths of the circumference with spiral cam faces $c$ and $d$ and through the other one-sixth of the circumference with abrupt drops $e$ and $f$. When the portions $c$ and $d$ are in full engagement, the centering pin 21 is in its uppermost position through the influence of the spring 105, and hence projects the thickness of six records above the turntable 20. The lead of the spiral faces $c$ and $d$ is uniform, and is such that upon indexing the wheel 112 through the distance of one tooth, the centering pin 21 will be retracted against the action of the spring 105 a distance equivalent to the thickness of one record.

The ratchet wheel 112 (see Figs. 5 and 6) is formed with six equally spaced teeth 113. Arranged for selective engagement with the teeth 113 is an oscillatory pawl 114 which is pivotally connected to one end of a lever 115 pivotally mounted intermediate its ends on a stud 116 on the base plate 25. The other end of the lever 115 is pivotally connected to one end of a link 117 having a slot 118 in its other end engaging the crank pin 48. It will be evident that immediately upon rotation of the disk 47, the pin 48 acting through the link 117 and the lever 115 will oscillate the pawl 114 to index the ratchet wheel 112 through a distance slightly in excess of one tooth.

A holding pawl 119 pivotally mounted on the stud 116 engages the ratchet wheel 112, and serves to locate and hold the latter accurately in indexed position. A coiled tension spring 120 is connected at its ends to the pawls 114 and 119, and serves to urge said pawls yieldingly against the ratchet wheel 112.

Suitable means is provided operable by the drive disk 47 for discharging the played record and for returning the tone arm 22 while in its elevated dwell position to initial playing position. In the present instance, this means (see Figs. 5, 6, 9 and 10) comprises a sleeve 121 freely rotatable on the upper end of the fixed bearing sleeve 45, and against a bearing ring 122 on the base plate 25.

The sleeve 121 is formed adjacent its upper end with a peripheral flange 123. A ring 124 is rotatably mounted on the sleeve 121 in end bearing engagement between the ring 122 and the flange 123, and is formed with a lateral lug 125. A link 126 pivotally connected to the lug 125 has a pin and slot connection 127 with a lateral arm 128 rigid with the crank arm 91. The lost motion connection 127 is effective after the tone arm 22 has been elevated to oscillate the ring 124 in one direction, and to return the ring to initial position while the tone arm is being lowered into playing postion. A stop pin 129 on the ring 122 serves to limit the return movement of the ring 124.

A yieldable drive connection is provided between the sleeve 121 and the ring 124 to cause them normally to move as a unit. To this end, a pin 130 on the sleeve 121 extends outwardly through a peripheral slot 131 in the ring 124. A coiled tension spring 132 anchored at is ends to the ring 124 and the outer end of the pin 130 tends to hold the pin in one extreme position in the slot 131.

Removably secured to the flange 123 is a ring 133 formed with a lateral arm 134 extending across the pin 88 carried by the tone arm 22. An abutment block 135 is rotatably mounted on the underside of the arm 134 for adjustment by means of a finger knob 136 into and out of position for engagement with the pin 88. Suitably spaced lugs 137 on the block 135 are disposed at opposite sides of a stop 138 on the arm 134, and serve with the stop selectively to define these positions of the block.

The free end of the arm 134 is formed with a lateral extension arm 139. A discharge finger 140 is pivotally mounted at one end on the extension arm 139. Preferably, the arm 139 and the finger 140 are formed respectively with interfitting ears 141 and 142 connected by means of a pintle 143. A tension spring 144 coiled about the pintle 143 impinges at its ends against the arm 134 and the finger 140, and tends to urge the free end of the latter downwardly. A screw 145 threaded through the arm 134 constitutes an adjustable stop for limiting the downward movement of the finger 140.

Mounted on the underside of the free end of the finger 140 is an abutment 146 adapted to engage the edge of the uppermost record of the stack to move the same off center when released by the pin 21 so as to cause centrifugal force to discharge the record into the receptacle 30. The free end of the finger 140 is bent upwardly at an angle to define a cam 147. This cam is adapted to engage the upper edge of the stack to force the finger 140 upwardly against the action of the spring 144 until the abutment 146 is in registration with the uppermost record.

It will be evident that after the tone arm 22 has been elevated and the centering pin 21 has been retracted one step to release the uppermost record, continued rotation of the disk 47 will move the finger 140 inwardly toward the records to discharge the uppermost record, and will move the arm 134 or the block 135 against the pin 88 to swing the tone arm 22 into initial position. In the final movement of the disk 47, the arm 134 and the finger 140 will be returned to initial position thus releasing the tone arm 22 for free swinging movement inwardly over the next record under the influence of the stylus 24.

A suitable cover plate 148 is positioned over the operating mechanism between the turntable 20 and the tone arm 22, and is formed with a suitable opening 149 through which the pin 88 extends.

Figure 5:
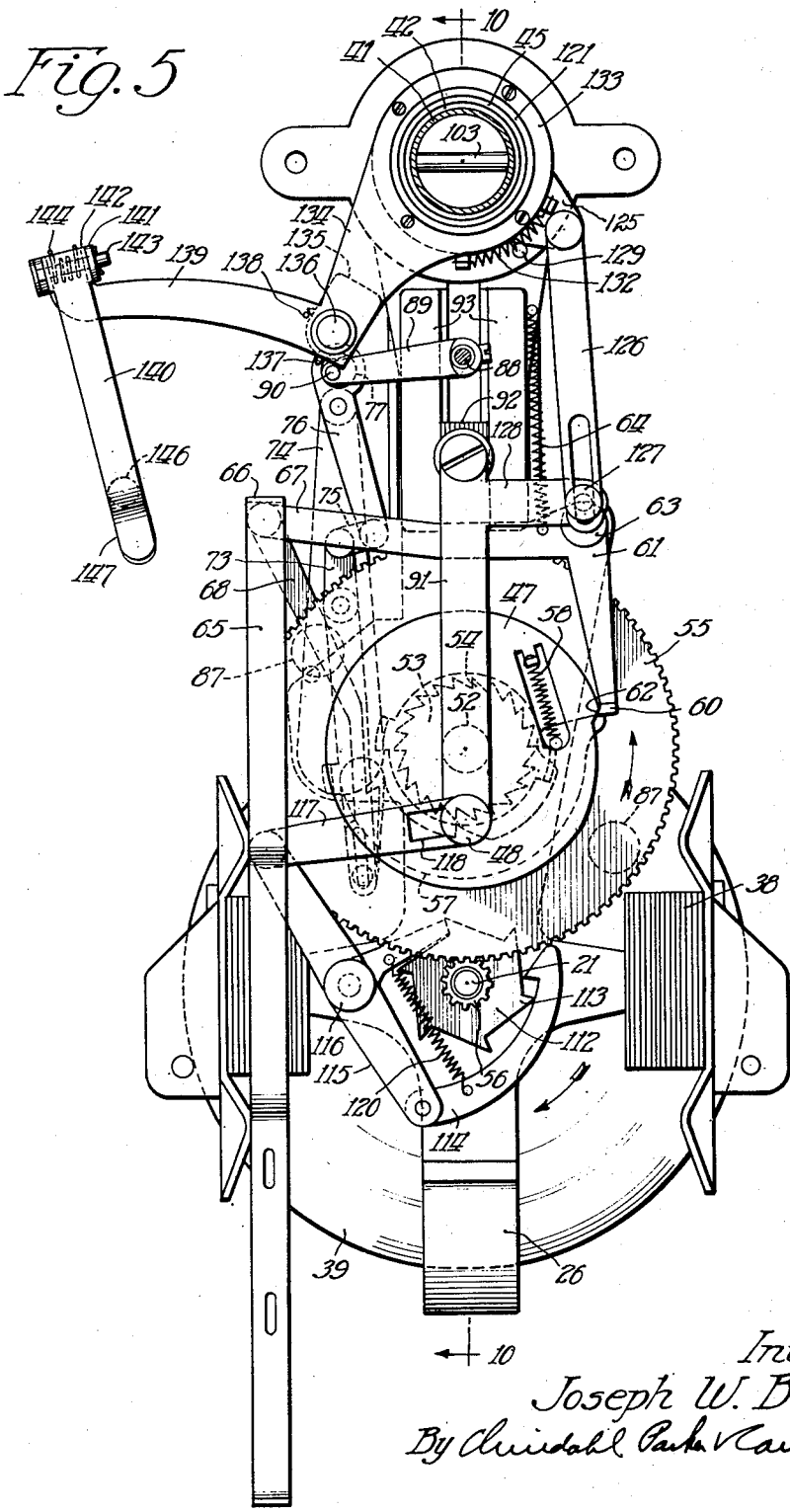
Fig. 5 is a plan view of the record changing mechanism in idle position.

The operation will be evident from the foregoing description, and briefly stated is as follows:

Any desired number of records up to six may be placed on the turntable 20. Assuming the motor to be in operation, the turntable 20, the clutch element 53 and the disk 71 will be driven continuously, but the drive disk 47 will be in its idle position as shown in Fig. 5. The stylus 24 is brought into engagement with the uppermost record, and the playing proceeds with the tone arm 22 moving inwardly.

Movement of the tone arm 22 inwardly will serve to hold the hook 69 out of the path of the lugs 70. When the tone arm 22 ceases its movement at the conclusion of the playing of the record, the abutments 87 will cam the hook 69 into the path of the lugs 70 on the disk 71. Upon engagement of one lug 70 with the hook 69, the pawl 57 will be released to close the clutch 49 to institute operation of the drive disk 47.

In the initial rotation of the disk 47, the tone arm 22 will be elevated to remove the stylus 24 from the played record, and simultaneously the centering pin 21 will be retracted to release the uppermost record. During the intermediate rotation of the disk 47, the finger 140 will be advanced to discharge the record and concurrently therewith the arm 134 will act against the pin 88 to return the tone arm 22 while elevated to initial position. While the arm 134 is moving outwardly, the hook 69 is held out of the path of the lugs 70 through engagement of the periphery of the disk 47 with the finger 60, and hence is rendered ineffectual to close the clutch 49. Upon continued rotation of the disk 47, the finger 140 will be retracted thus releasing the tone arm 22 for independent swinging movement, and the tone arm will be lowered to bring the stylus 24 into engagement with the next record at the starting point. At the end of one complete revolution of the disk, the finger 60 will engage the pawl 57, thereby opening the clutch 49 and causing the parts to come to rest in their initial position.

The foregoing operation is repeated for each record except that the last record is not released, but the centering pin 21 is returned into its uppermost position. Any record can be rejected before being played by actuating the bar 65 to institute the cyclic operation of the drive disk 47 independently of the position of the tone arm 22.

I claim as my invention:—

1. In a phonograph, in combination, a rotatable clutch element, a disk rotatable with said element and having a peripheral lug, a second clutch element movable into and out of engagement with said rotatable clutch element, spring means tending to effect said engagement, detent means for holding said second clutch element out of engagement with said first mentioned clutch element, release means for actuating said detent means to release said second clutch element, said release means comprising a part movable into and out of position for engagement by said lug, means movable with said disk for periodically moving said part into operative position, and means operable to move said part out of operative position to prevent engagement by said lug.

2. In a phonograph, in combination, a bearing, a disk, a gear and a rotatable clutch element in superimposed relation rigidly connected for unitary rotation on said bearing, power means for driving said gear, a lug on said disk, a driven member rotatable on said bearing over said clutch element, a second clutch element mounted on said driven member for movement into and out of engagement with said rotatable clutch element, spring means tending to establish said engagement, said second clutch element having an abutment projecting beyond the periphery of said driven member, a detent riding on the periphery of said driven member and adapted to engage said abutment to move said second clutch element out of engagement with said rotatable clutch element, a catch operably connected to said detent means and movable into and out of position for engagement by said lug, abutment means on the underside of said gear for periodically moving said catch into operative position, and means for moving said catch out of operative position.

3. In a phonograph, in combination, a movable clutch element, an abutment movable with said element, a second clutch element movable into and out of engagement with said first mentioned clutch element, spring means tending to effect said engagement, detent means movable into position to disengage said elements, release means for actuating said detent means to release said second clutch element, said release means comprising a part movable into and out of position for engagement by said abutment, means movable with said first mentioned element moving said part into operative position, and means operable to move said part out of operative position to prevent engagement by said abutment.

4. In a phonograph, in combination, a swinging tone arm, a rotatable clutch element, a rotatable driven member, power means for driving said element, a lug movable with said element, a second clutch element mounted on said driven member for movement into and out of engagement with said rotatable clutch element, means tending to establish said engagement, detent means movable into and out of position for engagement by said second clutch element to break said engagement, a catch operably connected to said detent means and movable into and out of position for engagement by said lug, abutment means movable with said rotatable clutch element for periodically moving said catch into operative position, and means responsive to the movement of said tone arm for moving said catch out of operative position so as to prevent engagement between said lug and said catch until said tone arm comes to rest.

5. In a phonograph, in combination, a pair of coacting clutch elements adapted to be moved into and out of engagement, a trip mechanism normally effective to hold said elements out of engagement, and means for actuating said trip mechanism, said trip mechanism comprising a rotatable member having a lug, a pivotal arm, a detent for disengaging said elements and adapted to be actuated to release said elements into engagement, a pair of levers pivotally mounted on said arm and connected by a link, a catch operatively connected to said detent and having a lost motion connection with the free end of one of said levers for movement thereby into and out of the path of said lug, means movable with said rotatable member for periodically actuating said last mentioned lever to move said catch into operative position, and means for swinging the other of said levers to return said catch to inoperative position to prevent engagement of said catch by said lug.

6. In a phonograph, in combination, a swinging tone arm, a driving clutch element, a driven clutch element adapted to be brought into and out of engagement with said driving clutch element, means normally in position for engagement by said driven clutch element to hold said elements out of engagement, an abutment movable with said driving clutch element, a hook connected to said means and adapted upon engagement by said abutment to move said means out of engagement with said driven element to effect engagement between said elements, motion increasing means responsive to the movement of said tone arm for moving said hook out of the path of said abutment, and means movable with said driving clutch element for periodically moving said hook into the path of said abutment.

7. In a phonograph, in combination, a driving clutch element, a circular disk having a notch in its periphery, a driven clutch element connected to said disk and movable into and out of engagement with said driving element, a lever having a detent riding on the periphery of said disk and adapted upon movement into said notch to engage said driven element to disengage said elements, spring means urging said detent against said disk, and means for actuating said lever to release said elements into engagement for one revolution of said disk.

8. In a phonograph, in combination, a swinging tone arm, a driving clutch element, a driven clutch element, means for moving said elements into engagement, a trip mechanism for normally holding said elements out of engagement, means movable with said driving element for periodically positioning said mechanism to release said elements into engagement, and means movable progressively by said tone arm to restore said mechanism to inoperative position before becoming operable to release said elements into engagement, said mechanism becoming operable upon cessation of movement of said tone arm.

9. In a phonograph, in combination, a base support, a guide sleeve in said support, a reciprocable sleeve in said guide sleeve, a sound box carried by said reciprocable sleeve, said guide sleeve being formed with two longitudinal diametrically opposite slots, a transverse pin carried by said reciprocable sleeve and extending through said slots, a pair of spaced arms constituting a lever pivoted on said support, said arms having slotted ends engaging the ends of said pin, and means for oscillating said lever.

10. In a phonograph, in combination, a base support, a vertical guide sleeve in said support, a reciprocable sleeve in said guide sleeve, a tone arm rotatably supported by said reciprocable sleeve, a sound box carried by said arm, said guide sleeve being formed with two longitudinal diametrically opposite slots, a transverse pin carried by said reciprocable sleeve and extending through said slots, a pair of spaced arms constituting a lever pivoted on said support, said arms being connected to the ends of said pin, and means for oscillating said lever to raise and lower said arm.

11. In a phonograph, in combination, a horizontal base support, a turntable rotatably mounted on said support, a guide on said support, a tone arm supported for vertical adjustment in said guide, said support being formed with horizontal ways between said turntable and said guide, a slide reciprocable in said ways, means for periodically reciprocating said slide, and means operable by said slide for elevating said tone arm, holding said tone arm in an elevated dwell position and lowering said tone arm in sequence.

12. In a phonograph, in combination, a horizontal base support, a vertical bearing in said support, a sleeve vertically reciprocable in said bearing, a tone arm rotatably supported by said sleeve, a sound box carried by said arm, a lever pivoted at one end to the underside of said support and pivotally connected at the other end to said sleeve, said lever being formed with a longitudinal slot having a cam portion and a dwell portion, said support being formed with ways over said lever, a slide reciprocable in said ways, and a pin carried by said slide engaging in said slot.

13. In a phonograph, in combination, a horizontal base support, a vertical bearing in said support, a sleeve vertically reciprocable in said bearing, a tone arm rotatably supported by said sleeve, a sound box carried by said arm, a lever pivoted at one end to said support and pivotally connected at the other end to said sleeve, said lever being formed with a longitudinal slot, and a slide reciprocable on said support and engaging said slot.

14. In a phonograph, in combination, a base support, a turntable rotatably mounted on said support, a member vertically reciprocable in said support, a slide reciprocable on said support, crank means for actuating said slide, a lever pivotally mounted on said support and connected to said member, said lever being formed with a longitudinal slot defining a cam portion and a dwell portion, and means on said slide slidably engaging in said slot.

15. In a phonograph, in combination, a support, a horizontal tone arm mounted on said support for swinging movement, a depending pin on said arm, an oscillatory arm extending across said pin and adapted to engage the latter to swing said tone arm, a pivotal abutment on said oscillatory arm movable into and out of position for engagement with said pin, and means for actuating said oscillatory arm.

16. In a phonograph, in combination, a support, a horizontal tone arm mounted on said support for swinging movement, an oscillatory arm, an abutment on said oscillatory arm adjustable into and out of position for engagement with said tone arm, and means for actuating said oscillatory arm.

17. In a phonograph, in combination, a base, a crank rotatably mounted on said base, a slide reciprocable on said base radially of said crank, a crank arm connecting said crank to said slide, a tone arm mounted on said base for vertical adjustment and for swinging movement, means operable by said slide for elevating and lowering said tone arm, and means operatively connected to said crank arm for swinging said tone arm in one direction when in elevated position.

18. In a phonograph, in combination, a base, a crank rotatably mounted on said base, a slide reciprocable on said base radially of said crank, a crank arm connecting said crank to said slide, a tone arm mounted on said base for vertical adjustment and for swinging movement, a depending pin on said arm, means operable by said slide for elevating and lowering said arm, an oscillatory arm extending across said pin for engagement therewith to swing said tone arm in one direction, and means operatively connected to said slide for actuating said oscillatory arm.

19. In a phonograph, in combination, a support, a vertical sleeve, a tone arm rotatably supported in said sleeve, a sleeve rotatable on said sleeve, a ring on said last mentioned sleeve, a yieldable driving connection between said last mentioned sleeve and said ring, means for oscillating said ring, a depending pin carried by said arm, and an arm secured to said last mentioned sleeve and extending across said pin for engaging the latter to swing said tone arm.

20. In a phonograph, in combination, a rotary support for a stack of records, an oscillatory arm, a finger pivotally mounted at one end on the free end of said arm, spring means tending to urge said finger downwardly, adjustable stop means for limiting the downward movement of said finger, a selector abutment on the underside of the free end of said finger, the free end of said finger being inclined upwardly to engage the upper edge of said stack to cam said selector abutment into the plane of the uppermost record for engagement therewith, and means for oscillating said arm.

21. In a phonograph, in combination, a rotary support having a retractable centering pin for a stack of records, a movable member, a finger movably mounted on said member, spring means tending to urge said finger downwardly, adjustable stop means for limiting the downward movement of said finger, a selector abutment on the underside of said finger, cam means on said finger adapted to engage the upper edge of said stack to cam said selector abutment into position to engage the uppermost record, and drive means for retracting said pin to release the uppermost record and for actuating said member to displace said record.

22. In a phonograph, in combination, a vertical spindle having an axial bore in its upper end, a centering pin slidably disposed in said bore and projecting from the upper end thereof, a spring in the inner end of said bore impinging against said centering pin and tending to urge the latter upwardly, said spindle being formed with two longitudinal diametrically opposite slots, a transverse pin on said centering pin extending outwardly through said slots, a cam member slidably mounted on said spindle and seating on the ends of said transverse pin, and a rotatable cam member on said spindle coacting with said first mentioned cam member and adapted upon rotation to retract said centering pin downwardly and at the end of said downward movement to release said centering pin for a return movement into its uppermost position.

23. In a phonograph, in combination, a vertical sleeve, a drive spindle extending through said sleeve, a centering pin slidably mounted in one end of said spindle and projecting therefrom, a cam member slidably mounted on said spindle and keyed to said sleeve, means connecting said cam member to said centering pin, and a cam member rotatably mounted on said spindle for engagement with said first mentioned cam member, each of said cam members being formed with a spiral cam terminating in an abrupt drop.

24. In a phonograph, in combination, a vertical sleeve, a vertical spindle extending axially through said sleeve, said spindle being formed with an axial bore in its upper end, a centering pin slidably disposed in said bore and projecting from the upper end thereof, a compression spring in the lower end of said bore urging said pin upwardly, said spindle being formed with two longitudinally diametrically opposite slots, a transverse pin secured to said centering pin and extending outwardly through said slots, a collar on said spindle seating on the ends of said transverse pin, a circular cam member slidably mounted on said spindle and seating on said collar, said cam member being keyed to said sleeve, a peripheral abutment on said spindle and a circular cam member rotatably mounted on said spindle and abutting against the underside of said abutment, said cam members having coacting cam faces for retracting said centering pin against the action of said spring.

25. In a phonograph, in combination, a vertical spindle, a turntable adapted to be mounted on the upper end of said spindle, said spindle being formed with an axial bore in its upper end, a centering pin slidably mounted in said bore and projecting upwardly from said turntable, spring means tending to urge said centering pin upwardly, a cam member operatively connected to said centering pin, a rotary cam member coacting with said first mentioned cam member, a ratchet rigid with said rotary cam member, a holding pawl in operative engagement with said ratchet, a lever, an indexing pawl carried by said lever for indexing said ratchet, and means for periodically oscillating said lever to index said ratchet, said cam members being formed with coacting surfaces adapted to retract said centering pin upon successive indexing of said ratchet in a step-by-step movement.

26. In a phonograph, in combination, a spindle having an axial bore in its upper end, a turntable adapted to be mounted on said spindle, a centering pin slidably disposed in said bore and adapted to project upwardly from said turntable, spring means tending to urge said centering pin upwardly, a ratchet having $n$ equally spaced teeth, a pawl mechanism automatically operable periodically to index said ratchet through one tooth, and means operatively connecting said ratchet to said centering pin and adapted to retract said centering pin $n-1$ steps upon $n-1$ indexing movements of said ratchet, and to release said centering pin for return movement to initial position under the influence of said spring in the succeeding indexing movement of said ratchet.

27. In a phonograph, in combination, a rotary support for a record to be played, a tone arm movable transversely over said support, a sound box carried by said tone arm, means for elevating and lowering said tone arm and for swinging said tone arm outwardly while elevated, means operable in timed relation to said first mentioned means for retracting said centering pin one step equivalent to the thickness of the record and for discharging the record, and a single means operable manually at will or automatically upon movement of said tone arm into a predetermined position for instituting the operation of said first and second mentioned means.

28. In a phonograph the combination of a turntable, a tone arm, a motor having a shaft for rotating said turntable, a rotatable member, driving connections between said shaft and said member for rotating said member more slowly than said shaft, a center pin for records on said turntable and means actuable by the rotary movement of said member to retract said center pin and release a record.

29. In a phonograph, the combination of a turntable, a tone arm, a motor having a shaft for rotating said turntable, means operable by said motor to swing said tone arm outwardly of said turntable, means operable after the playing of a record to actuate the first mentioned means, a center pin for records on said turntable and means mechanically connected to the first mentioned means and operable in unison therewith to retract said center pin and release a record.

30. In a phonograph the combination of a turntable, a hollow-drive spindle for said turntable, a centering pin slidably mounted in said spindle and projecting therefrom, spring means for urging said centering pin outwardly, a motor connected to said spindle, cam means for retracting said pin inwardly and ratchet means operable by said motor for imparting an incremental movement to said cam means.

In testimony whereof, I have hereunto affixed my signature.

JOSEPH W. BISHOP.